3,230,861
FOOD CONTAINER ADAPTED FOR USE IN ELECTRICALLY COOKING AND HEATING FOODS
Abraham L. Korr, 8712 Hickory Drive, Philadelphia 36, Pa.
Filed Feb. 27, 1963, Ser. No. 261,435
4 Claims. (Cl. 99—358)

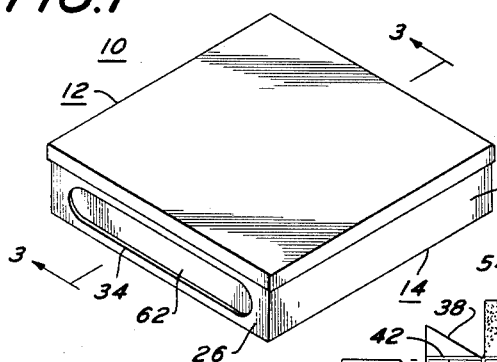
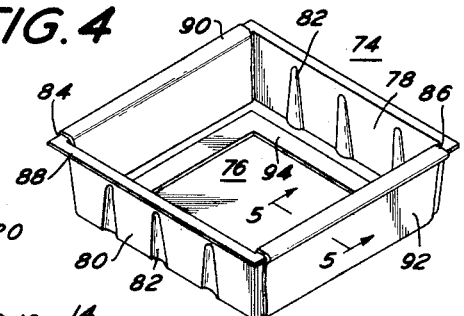
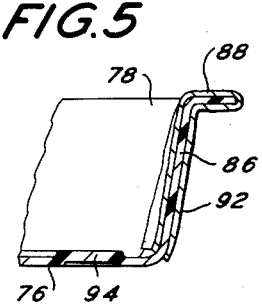
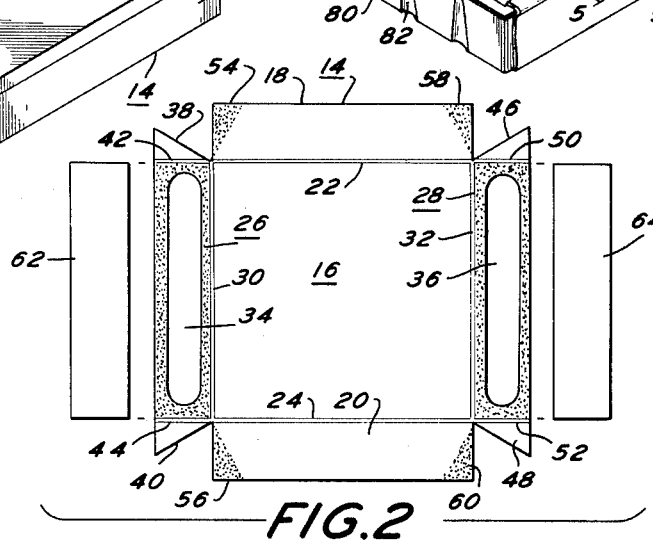
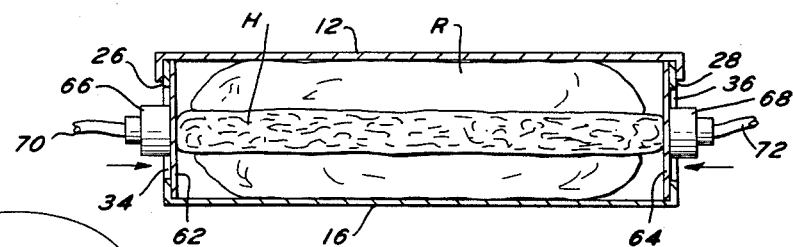
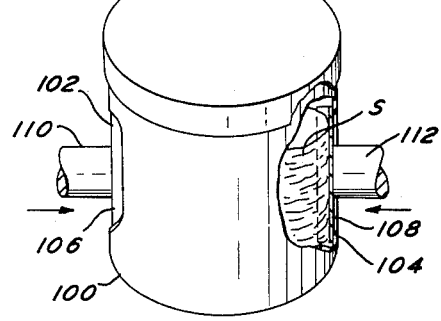
INVENTOR.
ABRAHAM L. KORR

United States Patent Office 3,230,861
Patented Jan. 25, 1966

In general, this invention relates to a new and improved food container within which food is to be electrically cooked and/or heated. More particularly, it relates to a food container within which food can be electrically cooked and/or heated.

In the past, it was difficult to cook and/or heat foods such as hot dogs, hamburgers, and the like by electrical resistance methods except by directly impaling the food on suitably positioned electrodes. Cold spots and/or burning of the food usually resulted by the use of the impaling method. Additionally, non-solid foods such as soup, pot pie, vegetables and the like, could not be heated uniformly and rapidly by the electrical resistance method.

Therefore, it is the general object of this invention to avoid and overcome the foregoing and other difficulties of the prior art practices by the provision of a new and improved food container for electrically heating and/or cooking foods therein.

A further object of this invention is to provide a better food container which has suitable large contact surface of film-type electrodes therein for connecting food within the container to a suitable source of electrical current.

A still further object of this invention is to provide a better and less expensive method of and apparatus for electrical resistance heating and/or cooking foods rapidly.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a perspective view of one embodiment of the present invention.

FIGURE 2 is a top plan view of a blank for manufacturing the bottom of the container shown in FIGURE 1.

FIGURE 3 is a cross sectional view of the container of FIGURE 1 in position to heat and/or cook a hamburger or other comestibles therein.

FIGURE 4 is a perspective view partially cut away of a second embodiment of the present invention.

FIGURE 5 is a cross sectional view of one side wall of the container of FIGURE 4 taken along line 5—5.

FIGURE 6 is a partially cut away view of a third embodiment of the present invention.

In FIGURE 1, there is shown a package for cooking and/or heating foods generally designated by the numeral 10.

The package 10 includes a top cover 12 and a heating and/or cooking container 14. The container 14 can better be seen with reference to FIGURE 2 in which the blank for making the same is shown in top plan view.

In FIGURE 2, the container 14 is shown as consisting of a bottom wall 16 having side walls 18 and 20 integrally secured to opposite parallel side edges 22 and 24 respectively. Bottom wall 16 also has parallel end walls 26 and 28 integral with opposite side edges 30 and 32 respectively. The end walls 26 and 28 are of the same height as side walls 18 and 20.

The end wall 26 has a cigar shaped opening 34 in the center thereof. A similar opening 36 is found in end wall 28. The end wall 26 additionally has side tabs 38 and 40 connected to opposite side edges thereof by fold lines 42 and 44. Similarly, end wall 28 has tabs 46 and 48 along opposite side edges thereof separated from end wall 28 by fold lines 50 and 52 respectively.

The inside of end walls 26 and 28 has an adhesive coating thereon. Additionally, the free corners 54 and 58 of side wall 18 and the free corners 56 and 60 of side wall 20 have an adhesive coating thereon whereby when the container end and side walls are folded into position, the tabs 42, 44, 46 and 48 will be respectively secured to the adhesive-coated corners 54, 56, 58 and 60.

There is additionally provided an aluminum foil or other electrically conducting panel 62 having a shape congruent to the outline of end wall 26. This aluminum foil panel 62 is placed on the end wall 26 so as to be secured thereto. A similar panel 64 is provided for the end wall 28 and secured in place.

As shown in FIGURE 3, when it is desired to heat and/or cook a hamburger H in a roll R, the hamburger is placed within the container of FIGURE 1 with cover 12 in place. The ends of the hamburger H are pressed against the aluminum foil panels 62 and 64 on the opposite end walls 26 and 28 of the container 14.

Suitable electrodes are placed against the outside surfaces of panels 62 and 64 through the openings 34 and 36 in the end walls 26 and 28 respectively. Thus, access is provided for the electrodes 66 and 68 in a simple manner. When electricity is supplied to the electrodes 66 and 68 through wires 70 and 72 respectively, current will pass through the hamburger H thus heating and/or cooking it a desired amount. This is a quick and simple method of uniformly heating and/or cooking the hamburger. It can be seen that other foods such as frankfurters, as provided in U.S. Patent 2,939,793, by Jacob S. Richman, or the like could be placed within the container 14 without limiting its effectiveness. This invention differs from that shown in U.S. Patent 2,939,793 in that comestibles other than frankfurters are also capable of being cooked and/or heated by this process in their own package. The present invention requires no additional work on the comestibles. The process shown in Patent 2,939,793 required the pulp to be exposed and the derma removed from the frankfurters. This is still mandatory for the process to work on a frankfurter. However, as stated previously, the container of the present invention can be utilized in a process for cooking and/or heating comestibles other than frankfurters.

In FIGURE 4, there is shown another type of container utilizing the principles of the present invention. The container 74 shown in FIGURE 4 consists of a bottom wall 76, oppositely disposed side walls 78 and 80, and oppositely disposed end walls 84 and 86. The entire container, as just discussed, is formed by molding a non-conducting plastic material such as polyethylene. To give strength to the side walls and end walls of the container, suitable ribbing 82 is provided about the periphery thereof. Additionally, the top of the container has a suitable annular flange 88 which forms the lip of the container.

The end walls 84 and 86 have metal foil coatings 90 and 92 respectively wrapped from the inside surface of the end walls over the lip 88 to the outside surface thereof. As suitable annular rib 94 is formed on the bottom wall of the container. It can be understood that the metal foil layers 90 and 92 may be adhesively coated thereto or may be in the form of a film suitably applied to the polyethylene container 74. This type of container 74, as shown in FIGURE 4, can be utilized to heat and/or cook by electrical resistance such non-solid foods as stews, pot pies, vegetables and the like, by virtue of the large surface area of the electrodes available as a conductor for the food to be heated or cooked and the plyability of the package allowing a sustaining pressure to be applied via the electrodes. The electrodes would merely be in contact with the outer surfaces of the coatings 90 and 92. The amount of heating and/or cooking by electrical resistance can be determined by the time during which current is passed through the foods.

In FIGURE 6, there is shown a third embodiment of the present invention generally designated by the numeral 96. The package for comestibles shown in FIGURE 6 is especially suitable for foods such as soups. The package 96 has a cover 98 and a container portion 100. A soup S is shown in the container 100.

The container 100 has suitable openings 102 and 104 on opposite sides thereof. In the openings 102 and 104 are aluminum foil panels 106 and 108 secured to the side walls of the container 100. This is done in the same manner as was discussed with respect to the container 14 of FIGURE 2. Electrodes 110 and 112 are merely placed in conducting relation with the panels 106 and 108 so that the soup S can be heated by supplying current to the conductors.

It can easily be understood that the packages 10, 74 and 96 are normally manufactured of a waterproof, nonconducting material except for the conducting coatings to which the electrodes are to be connected.

The present invention may be embodied in other specific forms without departing from the spirit or essential attributes thereof and, accordingly, reference should be made to the appended claims, rather than to the foregoing specification as indicating the scope of the invention.

I claim:
1. A food container comprising a non-conductive main body including a bottom wall and a substantially upstanding peripheral wall connected to the periphery of said bottom wall to define a food cavity, elongated openings in opposed portions of said peripheral wall exposing said food cavity to the exterior of said container, and an electrically conductive panel secured to an interior surface of said peripheral wall and extending over each of said openings, said openings being smaller than said panels, said electrically conductive panels being accessible from the interior and exterior of said main body.

2. A food container comprising a non-conductive main body including a bottom wall and a substantially upstanding peripheral wall connected to the periphery of said bottom wall to define a food cavity, a removable non-conductive cover seated on said peripheral wall to close said food cavity, elongated openings in opposed wall portions of said container exposing said food cavity to the exterior of said container, and an electrically conductive panel secured to an interior surface of said opposed wall portions and extending over each of said openings, said openings being smaller than said panels, said electrically conductive panels being accessible from the interior and exterior of said main body.

3. A food container comprising a non-conductive main body including a bottom wall and a substantially upstanding peripheral wall connected to the periphery of said bottom wall to define a food cavity, said peripheral wall having an inner surface in communication with said food cavity, and an outer surface in communication with the exterior of said container, a removable non-conductive cover for said cavity, separate electrically conductive layers of material on two opposed wall portions of said peripheral wall, said bottom wall and remaining peripheral walls being interiorly exposed, said electrically conductive layers of material being accessible from the inner surface of said opposed wall portions and the outer surface of said opposed wall portions.

4. The food container of claim 3 wherein said electrically conductive layers of material extend continuously from the inner surface of said opposed wall portions, respectively to the outer surface of said opposed wall portions over the top of said peripheral wall portions.

References Cited by the Examiner
UNITED STATES PATENTS

| | | | |
|---|---|---|---|
| 1,961,681 | 6/1934 | Bohart | 99—233 X |
| 2,013,675 | 9/1935 | Steerup | 99—233 X |
| 2,474,390 | 6/1949 | Aff | 99—174 |
| 2,704,259 | 3/1955 | Lamb | 99—109 |
| 2,939,793 | 6/1960 | Richman | 99—174 |
| 2,959,339 | 11/1960 | Sierk et al. | 99—174 X |
| 3,062,663 | 11/1962 | Furgal et al. | 99—174 X |
| 3,093,287 | 6/1963 | Stark | 229—3.1 |
| 3,113,874 | 12/1963 | Baush et al. | 99—174 |

CHARLES A. WILLMUTH, *Primary Examiner.*
HYMAN LORD, ROBERT E. PULFREY, *Examiners.*